United States Patent [19]

Poirier d'Ange d'Orsay

[11] 4,204,270
[45] May 20, 1980

[54] METHOD AND APPARATUS FOR ADJUSTING THE ORIENTATION OF VEHICLE HEADLIGHTS

[75] Inventor: Emmanuel H. Poirier d'Ange d'Orsay, Toulouse, France

[73] Assignee: Societe pour l'Equipement de Vehicules, Issy-les-Moulineaux, France

[21] Appl. No.: 836,897

[22] Filed: Sep. 26, 1977

[30] Foreign Application Priority Data

Sep. 24, 1976 [FR] France .................. 76 28796

[51] Int. Cl.² ........................................... B60Q 1/10
[52] U.S. Cl. .................................... 362/71; 362/250
[58] Field of Search .................. 315/77, 82; 362/71, 362/61, 250; 364/856

[56] References Cited

U.S. PATENT DOCUMENTS

| 3,207,891 | 9/1965 | Eberle | 362/71 |
| 3,634,677 | 1/1972 | Wolffing-Seelig | 362/71 |
| 3,808,417 | 4/1974 | Martin | 362/71 |
| 3,873,881 | 3/1975 | Inoue | 315/82 |

FOREIGN PATENT DOCUMENTS

| 696108 | 10/1964 | Canada | 364/856 |
| 1780341 | 12/1971 | Fed. Rep. of Germany | 362/71 |

OTHER PUBLICATIONS

"Model F2V Function of Two Variables," George A. Philbrick Researches, Inc. pp. 1-15.

*Primary Examiner*—Stephen C. Bentley
*Attorney, Agent, or Firm*—Brisebois & Kruger

[57] ABSTRACT

A method and apparatus for adjusting a vehicle headlight to maintain the point of intersection of the headlight beam with the roadway at a fixed predetermined distance, and which compensates for changes in both static and dynamic loading of the vehicle.

16 Claims, 2 Drawing Figures

METHOD AND APPARATUS FOR ADJUSTING THE ORIENTATION OF VEHICLE HEADLIGHTS

BACKGROUND OF THE INVENTION

One knows that when an automotive vehicle is driven on a roadway along a particular path of travel during the night, it is desirable to light the roadway in front of the vehicle in the best possible way over a sufficient distance to assure safety but limited by the power of the headlights. However, the intensity of the headlights should be as reduced as possible for the benefit of drivers of approaching or crossing vehicles. For this purpose, it is desirable, during movement of the vehicle, to maintain essentially constant a distance L between the vehicle and the point of impingement of the axis of the headlight beam on the road, along the assumed travel path along the road by rotation of the headlight around an axis essentially perpendicular to the path of travel of the vehicle and parallel to the road surface. One can of course satisfactorily adjust the vehicle headlights when the vehicle is empty, but this adjustment is destroyed or lost when the vehicle is loaded more or less in the front or in the rear, such variations in load taking place during acceleration or deceleration and appearing as a variation of the position or height of the center of gravity in relation to the roadway, hereafter called depth variations, and/or by a variation of the inclination of the vehicle in relation to the roadway, hereafter called attitude variation.

One has already proposed, for example in French Pat. No. 69-37513, a regulating apparatus for correcting the variation of inclination of the vehicle, that is to say variations in attitude of the vehicle. To do this, it has been proposed to adjust the position of the vehicle body in relation to the ground by means of sensors placed adjacent to the axles at the front and rear of the vehicle. If one calls $d_1$ the distance of the body from the ground plumb with a point $P_1$ near the front sensor, and $d_2$ the distance of the body to the ground plumb with a point $P_2$ near the rear sensor, and if one calls $\alpha$ an angle of adjustment of the position of the headlight beam axis in relation to the vehicle, the prior technique consists of adjusting the beam in such a way that the angle $\alpha$ would have a value $\alpha = K(d_2 - d_1) + K'$ a formula in which K and K' are constants.

Such adjustment takes into consideration variations in inclination of the vehicle but does not consider variations in depth or height. It has been ascertained that the adjustment thus obtained was insufficient and that it was then desirable to improve the characteristics of the adjustment. The object of this invention is an adjustment process considerably improving the maintaining of the distance L contant. To do this, according to the invention, one takes into consideration, to calculate the adjustment angle of the headlight beam, not only the inclination of the vehicle but also the height of the vehicle with respect to the road surface. This distance can be determined by a variable quantity $(d_1 + d_2)/2$ in such a way that the above mentioned angle $\alpha$ is defined by: $\alpha = K(d_2 - d_1) + K' + K''(d_2 + d_1)$, $(d_2 + d_1)$. K'' being a constant.

According to the invention, an adjustment technique is used, in which the adjustment angle $\alpha$ of the headlight beam is caused by any appropriate means to stay essentially equal to a correction angle $\alpha_o$ defined by a formula in the form:

$$\alpha_o = K_1(d_1 - d_2) + K_2 d_1 + K_3$$

One has determined, surprisingly and unexpectedly, that almost exact constancy or stability can be obtained in the distance L when the coefficients $K_1$ and $K_2$, above defined, satisfy the relation:

$$l_2 K_1 + l_1 K_2 \simeq 1$$

$l_2$ designating the distance between the points $P_1$ and $P_2$ associated with the front axle and the rear axle, and $l_1$ designating the distance between the point $P_1$ and the axis of rotation, of the headlight to be adjusted. The precise adjustment which is obtained when one uses this technique, provides in all conditions of use of the vehicle, distance L constant within nearly 2% the distance L being in general, close to about 75 meters.

The present invention has correspondingly, as an object, a new adjustment procedure for the position of a headlight of an automotive vehicle in relation to the vehicle body, the headlight being capable of pivoting around an axis essentially parallel to the roadway and perpendicular to the vehicle travel path, and having as its position an angle $\alpha$, this procedure comprising using at least one sensor $C_1$ near the front wheels and at least one sensor $C_2$ near the rear wheels, the sensors $C_1$ and $C_2$ defining respectively the distance $d_1$ and $d_2$ corresponding to the distance of the body from the roadway plumb to the points $P_1$ and $P_2$ of the body, the point $P_1$ being at a distance $l_1$ from the axis of rotation of the headlight, and at a distance $l_2$ from the point $P_2$, the distances $l_1$ and $l_2$ being measured by projection on the line $P_1 P_2$, in which one defines an angle of correction $\alpha_o$ as a function of $d_1$ and of $d_2$ and in which one maintains the angle $\alpha$ equal to or near $\alpha_o$, characterized by the fact that the angle $\alpha_o$ has as its value:

$$\alpha_o = K_1(d_2 - d_1) + K_2 d_1 + K_3$$

a formula in which $K_1$, $K_2$ and $K_3$ are constants, $K_1$ and $K_2$ being related by the relationship $K_1 l_2 + K_2 l_1 \simeq 1$.

It has been ascertained that the adjustment process according to the invention will permit obtaining more satisfactory results because the relation linking the values $l_1$ and $l_2$ and the constants $K_1$ and $K_2$ is better satisfied. In practice, one operates in such a way that the constants $K_1$ and $K_2$ are such that the expression $K_1 l_2 + K_2 l_1$ has a value in the range between 0.9 and 1.1. Of course, in the relation between the values of $K_1$ and $K_2$, the lengths $l_1$ and $l_2$ are expressed in the same units.

According to the invention, maintaining the value of $\alpha$ at the value of $\alpha_o$, by adjustment of the headlights, can be done by an appropriate means, that is to say, either by a manually adjustable apparatus, or by an apparatus which automatic controls the adjustment. In the case of a manual adjustment, the user can for example place in coincidence a first indicator whose position is a function of $\alpha$ and a second indicator whose position is a function of $\alpha_o$, this second indicator being controlled automatically from information provided by the sensors $C_1$ and $C_2$. In the case of an automatic adjustment, the angle $\alpha$ can be kept equal to $\alpha_o$ by an appropriate mechanical, hydraulic, electrical or other apparatus.

The present invention has also as an object an apparatus for performing the above described process.

In particular, the invention has as an object an apparatus with automatic adjustment for the orientation of a headlight of an automotive vehicle, this apparatus comprising near the front wheels of the vehicle at least one sensor $C_1$ and near the rear wheels of the vehicle at least one sensor $C_2$, the headlight being able to pivot around an axis essentially parallel to the roadway and transverse to the axis of the vehicle and being referenced in relation to the vehicle body by an angle $\alpha$, this apparatus comprising a calculator which, from the information $d_1$ and $d_2$ provided by the sensors $C_1$ and $C_2$ respectively, provides a voltage $V_1(\alpha_o)$, indicative of $\alpha_o$, a datum information device providing a voltage $V(\alpha)$ indicative of $\alpha$, the angle of the headlight, $V(\alpha)$ being equal to $V_1(\alpha_o)$ when $\alpha$ equal $\alpha_o$, the apparatus comprising in addition, a control means acting as a function of the difference $V(\alpha)-V_1(\alpha_o)$, in the desired position of the headlight to cancel the difference, characterized by the fact that the calculator means generates the voltage $V_1(\alpha_o)$ by taking for $\alpha_o$, the value $\alpha_o = K_1(d_2-d_1)+K_2d_1+K_3$ with $l_2K_1+l_1K_2 \simeq 1$ In the definition given above, of the apparatus according to the invention, the symbols $K_1$, $K_2$, $K_3$, $l_1$, $l_2$, $d_1$, $d_2$ have the significance already indicated. In a preferred embodiment the calculator means takes the form of an electronic circuit receiving from sensors $C_1$ and $C_2$, voltages as a function of $d_1$ and $d_2$; the voltages sent to the calculator by the sensors $C_1$ and $C_2$ are proportional to distances $d_1$ and $d_2$; the aforementioned information device being a potentiometer moved by an element joined to the headlight; the voltages $V(\alpha)$ and $V_1(\alpha_o)$ being sent by a subtractor unit whose output feeds, by means of an intermediate amplifier, the control means; the control means being an electric motor causing the headlight to pivot about it axis of rotation.

As is evident this apparatus can be made to have a limited zone or region of operation. More specifically, the angle $\alpha$ can be maintained between two limits, by providing a stop or blocking device to stop the motor or other control means when the voltage $V(\alpha)$ goes beyond either of the two limits between which it is desired to control the headlight beam. In this instance the apparatus of the invention comprises stop means associated with the information data means, the stop means receiving a voltage as a function of $\alpha$, comparing the voltage to predetermined limiting voltages, and stopping or blocking the control means when the information voltage exceeds the limiting voltages.

It is clear that the adjusting apparatus can be used to simultaneously adjust both headlights of a vehicle. However, a control or feedback loop can be provided for each headlight to permit individual control of the headlight at each side of the vehicle. Such apparatus advantageously comprises a single calculator which sends the same $V_1$ voltage to each of two separate identical regulating loops, one controlling the position of each headlight.

This invention has as another object, a new commercial apparatus which constitutes an automotive vehicle comprising a means for pivoting the front headlights of a vehicle about an axis parallel to the road surface and perpendicular to the vehicle axis, characterized by the fact that the headlight is controlled by an apparatus to adjust its position, in the manner specified above.

For a better understanding of the invention there is now described a preferred embodiment, purely by way of example and not to be deemed limiting, in context with the drawings.

DETAILED DESCRIPTION OF THE PREFERRED EMBODIMENT

Figure 1:
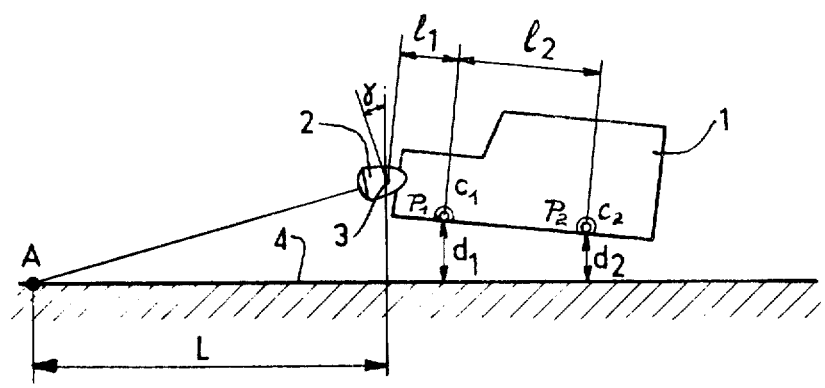
FIG. 1 is a schematic view in elevation of a vehicle having two sensors, $C_1$ and $C_2$, and showing other parameters according to the invention.

Referring to the drawings, vehicle 1 is equipped with two identical headlights 2, one on each side of the vehicle. Each headlight 2 can pivot about an axis 3, parallel to the roadway 4 but perpendicular to the longitudinal axis of the vehicle and its path of travel. During their pivotal movement the axes of the headlights remain fixed with respect to the vehicle, and the angular position of the headlights in relation to the vehicle body is represented by the angle $\alpha$, in FIG. 1. The axis of the light beam from headlight 2 intersects the surface of the roadway 4 at a point A, the horizontal projection of the beam onto the roadway surface between point A and pivotal axis 3 of the headlight defining the length L. On the vehicle, at a point near the front wheels is a sensor $C_1$, and at a point near the rear wheels is a sensor $C_2$. In the embodiment described, the points $P_1$ and $P_2$ on the vehicle body coincide with the positions of the sensors $C_1$ and $C_2$. The sensors $C_1$ and $C_2$ provide continuous outputs in the form of voltages proportional respectively to the distances $d_1$ and $d_2$, of the front and rear of the body of the vehicle in relation to the roadway 4 at the respective location of sensors $C_1$ and $C_2$. In projection along the line $P_1 P_2$, $l_1$ designates the distance from sensor $C_1$ to the pivotal axis 3 of the headlight, and $l_2$ designates the distance between the two sensors $C_1$ and $C_2$.

The control or regulation apparatus according to the invention comprises a calculator 5 which receives on its two inputs 6 and 7, respectively, the voltages from the sensors $C_1$ and $C_2$. In response to these voltages, the calculator generates a voltage $V_1$ which is a function of $\alpha_o$, $\alpha_o$ being a parameter defined by the two following equations:

$$\alpha_o = K_1(d_2-d_1)+K_2d_1+K_3$$

where $$l_2K_1+l_1K_2=1$$

$K_1$, $K_2$, and $K_3$ being constants, and $l_1$, $l_2$, $d_1$, and $d_2$ having been described above.

Figure 2:
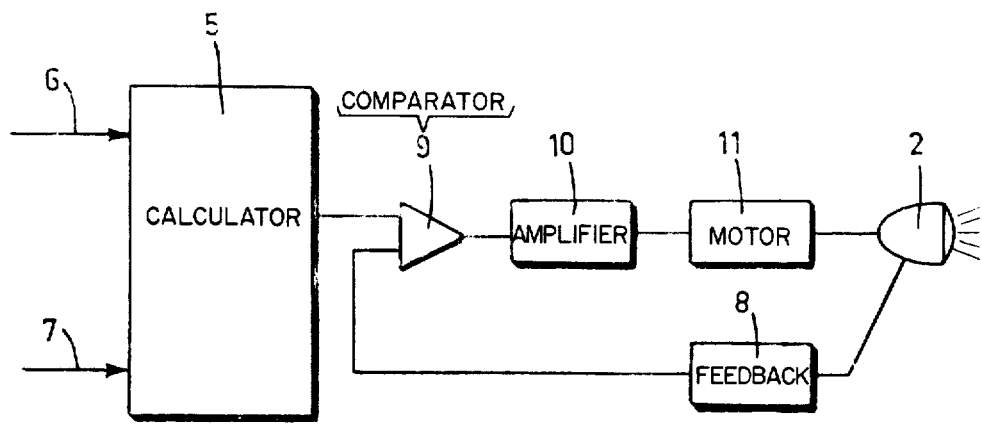
FIG. 2 is a block diagram of the apparatus and system for automatically adjusting the headlight position, according to the invention.

The headlights 2 are associated with an information means 8 in the form of a feedback potentiometer which sends a voltage V as a function of $\alpha$. The voltage $V_1(\alpha_o)$ is equal to the voltage $V(\alpha)$ when angle $\alpha$ equals $\alpha_o$. The output of calculator 5 is sent to one input of a subtractor or comparator 9, and the output of information means 8 is sent to the other input of the subtractor. The output of the subtractor is fed to an amplifier 10 which is of the type to operate the control means 11. The control means 11 is for example a reversible electric motor; the motor driving the headlight or headlights with which it is associated in the proper direction to cause $\alpha$ to be equal to $\alpha_o$. The gain of the amplifier 10 is so selected that the feedback loop of FIG. 2 provides stable regulation.

One has found with the apparatus of this type, that one can maintain a distance L equal to 75 meters at nearly 2% despite changes of load of the vehicle and changes of height and attitude of the vehicle due to abrupt accelerations and decelerations. This result is a considerable improvement in relation to the apparatus of the prior art which in general could not maintain the distance L constant closer than about 20%.

Sensors $C_1$ and $C_2$ are each preferably connected between the vehicle body and the vehicles axles, to provide an indication of the height of the vehicle body with respect to the axles at each end of the vehicle. These sensors can be for example, linear potentiometers, the output signal from which varies in direct proportion to the distance between the points $P_1$ and $P_2$ and the respective vehicle axles. The subtractor or comparator 9 is preferably of the type which provides at its output, a positive signal when $V_1$, is greater than V, a negative signal when $V_1$ is smaller than V, and a zero output when $V_1$ is the same as V. Amplifier 10 is advantageously of the type which provides positive, negative, or zero signals corresponding to those of the output of the subtractor. The reversible control motor 11 responds to the polarity of the signals from the amplifier to drive the headlight about its axis in the required direction. Calculator 5 can of course include a suitable delay circuit to eliminate the effects of bumps and rough road surfaces on the control and feedback equipment.

As is apparent, numerous changes and modifications can be made without departing from the scope of this invention.

What is claimed is:

1. A process for regulating the position of a headlight with respect to a vehicle body, to compensate for changes in height and inclination of the vehicle and to maintain essentially constant the distance between the vehicle and the point of impingement of the headlight beam on the roadway comprising, the steps of, sensing a height $d_1$ of the vehicle body relative to the roadway at a point $P_1$ near the front of the vehicle with a first sensor $C_1$, sensing a height $d_2$ of the vehicle body relative to the roadway at a point $P_2$ near the rear of the vehicle with a second sensor $C_2$, and rotating the headlight about an axis parallel to the roadway and perpendicular to the vehicle path to adjust the headlight to an angle $\alpha$ with respect to the vehicle body which is substantially equal to an angle $\alpha_o$, where $$\alpha_o = K_1(d_2-d_1)+K_2d_1+K_3,$$

$K_1$, $K_2$, and $K_3$ being constants, and $K_1$ and $K_2$ being related by the expression: $K_1l_2+K_2l_1\approx 1$, where $l_1$ is the distance between the rotational axis of the headlight and point $P_1$ projected on a line $P_1 P_2$ through the points $P_1$ and $P_2$, and $l_2$ is the distance between points $P_1$ and $P_2$.

2. A process according to claim 1 wherein said step of rotating a headlight to an angle $\alpha$ with respect to the vehicle body comprises, indicating the angle $\alpha$ on a first indicator in the vehicle, indicating the angle $\alpha_o$ on a second indicator in the vehicle, and manually operating a control in the vehicle to rotate the headlight to the position in which $\alpha$ is substantially equal to $\alpha_o$.

3. A process according to claim 1 wherein, said step of rotating a headlight to an angle $\alpha$ comprises, generating a first voltage V indicative of the angle $\alpha$, generating a second voltage $V_1$, indicative of angle $\alpha_o$, and adjusting angle $\alpha$ in a direction to cause V to essentially equal $V_1$.

4. Apparatus for adjusting the position of a headlight with respect to the body of a vehicle comprising, a headlight, means mounting the headlight for adjustment about an axis parallel to the roadway and perpendicular to the vehicle path, motor means for rotating the headlight to an adjustment angle $\alpha$ with respect to the vehicle body, a first sensor $C_1$ mounted near the front of the vehicle for sensing the height $d_1$ of the vehicle body relative to the roadway at a point $P_1$ of the vehicle body, a second sensor $C_2$ mounted near the rear of the vehicle for sensing the height $d_2$ of the vehicle body relative to the roadway at a point $P_2$ near the rear of the vehicle body, means for deriving a voltage $V_1(\alpha_o)$ indicative of the desired angle $\alpha$, where $$V_1(\alpha_o)=K_1(d_2-d_1)+K_2d_1+K_3,$$

$K_1$, $K_2$ and $K_3$ being constants, and $K_1$ and $K_2$ being related by the expression $K_1l_2+K_2l_1\approx 1$, where $l_1$ is the distance between the axis of rotation of the headlight and point $P_1$ projected on a line $P_1 P_2$ through the points $P_1$ and $P_2$, and $l_2$ is the distance between points $P_1$ and $P_2$, sensing means for generating a voltage V ($\alpha$) indicative of the angle $\alpha$ between the headlight and the vehicle body, means for comparing $V_1(\alpha_o)$ with V ($\alpha$), and means responsive to a difference between $V_1(\alpha_o)$ and V ($\alpha$) for generating a signal to operate said motor means to adjust the headlight to cause said voltage V ($\alpha$) to substantially equal $V_1(\alpha_o)$.

5. Apparatus according to claim 4 wherein said sensors $C_1$ and $C_2$ generate voltages indicative of $d_1$ and $d_2$, respectively.

6. Apparatus according to claim 5 wherein the voltages generated by $C_1$ and $C_2$ are each proportional to $d_1$ and $d_2$.

7. Apparatus according to claim 4 wherein said sensing means for generating voltage V ($\alpha$) is a potentiometer.

8. Apparatus according to claim 4 wherein said means for comparing $V_1(\alpha_o)$ with V ($\alpha$) is a subtractor, and means responsive to a difference between $V_1(\alpha_o)$ and V ($\alpha$) is an amplifier connected to said motor means.

9. Apparatus according to claim 4 wherein, said motor means is an electric motor.

10. Apparatus according to claim 4 further comprising means responsive to the voltage V ($\alpha$) from said sensing means for stopping operation of the apparatus whenever V ($\alpha$) goes outside a predetermined voltage range.

11. Apparatus according to claim 4 wherein the apparatus comprises a separate feedback loop for each headlight, each loop including a different sensing means, motor operating device and means for separately adjusting each headlight.

12. Apparatus according to claim 11 wherein said apparatus comprises a single calculator means for deriving the voltage $V_1(\alpha_o)$, and two separate feedback loops for sensing and controlling the angle $\alpha$ of the respective headlights.

13. An automotive vehicle wherein the vehicle is equipped with the apparatus of claim 4.

14. A process according to claim 1 wherein said step of sensing height d, of the vehicle at point $P_1$ comprises sensing the height of the vehicle body with respect to the front wheels of the vehicle, and said step of sensing the height $d_2$ of the vehicle at point $P_2$ comprises sensing the height of the vehicle body with respect to the rear wheels of the vehicle.

15. Apparatus according to claim 4 wherein said first sensor $C_1$ comprises means for sensing the height of a front portion of the vehicle body with respect to its front wheels, and said second sensor $C_2$ comprises means for sensing the height of a rear portion of the vehicle body with respect to its rear wheels.

16. Apparatus according to claim 4 wherein said motor means comprises means for simultaneously adjusting both vehicle headlights.

* * * * *